W. J. BURNS.
MACHINE FOR MAKING PLASTIC ARTICLES.
APPLICATION FILED JULY 5, 1916.
1,199,449.
Patented Sept. 26, 1916.
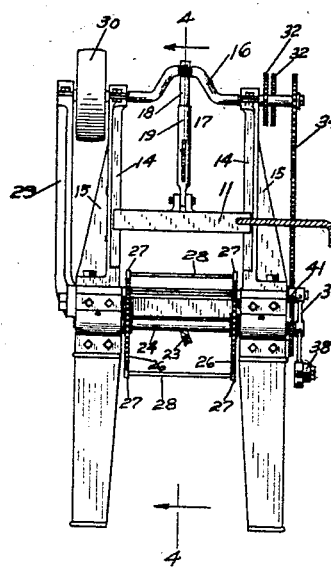
Fig. 1
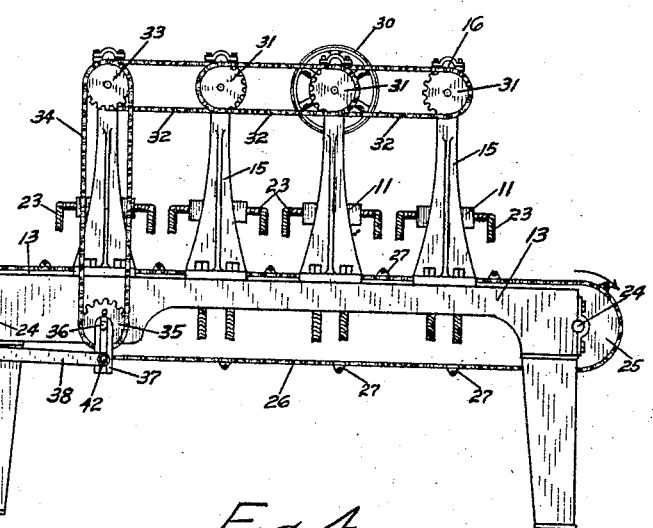
Fig. 2
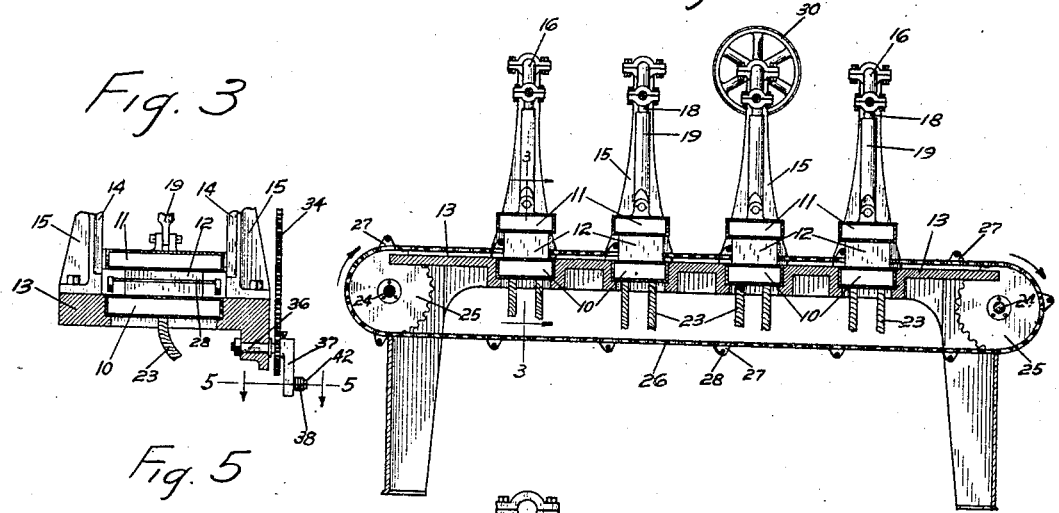
Fig. 3  Fig. 4  Fig. 5  Fig. 6
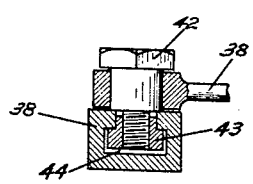
WITNESS
Chester F. Hayden
INVENTOR
William J. Burns
BY
A. M. Wooster
ATTORNEY

UNITED STATES PATENT OFFICE.

WILLIAM J. BURNS, OF BRIDGEPORT, CONNECTICUT, ASSIGNOR TO THE PEERLESS VULCANITE COMPANY, OF BRIDGEPORT, CONNECTICUT, A CORPORATION OF CONNECTICUT.

MACHINE FOR MAKING PLASTIC ARTICLES.

1,199,449.   Specification of Letters Patent.   Patented Sept. 26, 1916.

Application filed July 5, 1916. Serial No. 107,508.

*To all whom it may concern:*

Be it known that I, WILLIAM J. BURNS, a citizen of the United States, residing at Bridgeport, county of Fairfield, State of Connecticut, have invented an Improvement in Machines for Making Plastic Articles, of which the following is a specification.

This invention relates to the production of articles from plastic material, which shall be perfect in form and finish, and has for its object to provide a machine for heating, pressing and cooling plastic articles in dies, which may be operated by a single person, will produce the articles much more rapidly than has heretofore been possible and will enable the operator to control the heating and cooling and thus avoid injury to the articles; which will, in brief, produce a great saving in the cost of production of plastic articles by reducing the number of operators required, by increasing the rapidity of production, and by eliminating loss from imperfect articles. With these and other objects in view, I have devised the novel machine which I will now describe, referring to the accompanying drawing forming a part of this specification and using reference characters to indicate the several parts.

Figure 1 is an end elevation as seen from the left in Fig. 2; Fig. 2 a side elevation; Fig. 3 a detail sectional view on the line 3—3 in Fig. 4, looking in the direction of the arrows; Fig. 4 a longitudinal section on the line 4—4 in Fig. 1, looking in the direction of the arrows; Fig. 5 a detail sectional view on an enlarged scale on the line 5—5 in Fig. 3, looking in the direction of the arrows, and Fig. 6 is a detail sectional view on an enlarged scale of one of the crank rods.

The invention comprises a plurality of stationary and movable platens, a portion of which are heated by steam or otherwise, the others being cooled by passing water through them, and means for carrying the dies from one pair of platens to another while the plastic material in the dies is being operated upon.

10 denotes the stationary platens, 11 the movable platens, and 12 the dies. In the present instance, I have shown four pairs of platens, and it may be assumed that two pairs of platens are heated and two pairs are cooled, although any number of pairs of platens that may be found convenient in manufacturing plastic articles may be used, and the number of pairs of heated and cooled platens may be varied to suit the requirements of use.

13 denotes the bed of the machine, which is provided with sockets adapted to just receive the stationary platens, leaving the upper surfaces thereof flush or substantially so with the surface of the bed. The movable platens reciprocate on ways 14 on standards 15 extending upward from the sides of the bed. Crank shafts 16 are journaled in the upper ends of opposite standards, and a connecting rod 17 connects each movable platen with the corresponding crank. The connecting rods are preferably made yielding. I have therefore shown them as made in two parts, indicated specifically by 18 and 19, part 18 being adapted to slide within part 19 against the power of a spring 20, see Fig. 6. A cross pin 21 extending from opposite sides of part 18 engages slots 22 in part 19.

23 denotes flexible pipes connected to the stationary and movable platens by which they are supplied with either steam or water, as may be required, one of the pipes leading to each platen being of course a supply pipe and the other an escape pipe. Shafts 24 journaled at the ends of the bed each carry two sprocket wheels 25.

26 denotes sprocket carrying chains on opposite sides of the bed, each chain passing over a sprocket wheel 25 at each end of the bed. Lugs 27, properly spaced, extend from chains 26, and cross-rods 28 engaging opposite lugs act to move the dies over the surface of the bed and the stationary platens. One end of one of the crank shafts is extended, its outer end being journaled in a bracket 29 extending upward from the bed. This extension of a crank shaft carries a belt pulley 30 over which a belt, not shown, passes to drive the machine. The several crank shafts are provided with sprocket wheels 31, and sprocket chains 32 extending from crank shaft to crank shaft drive them all from the extended crank shaft carrying the belt pulley. One of the crank shafts carries a feeding sprocket wheel 33 from which a sprocket chain 34 extends over a sprocket wheel 35 on a shaft 36 journaled in a bracket depending from the bed. This shaft also carries a crank arm 37 from which a connecting rod 38 extends to one arm of a bell crank lever 39 mounted to oscillate on one of the end shafts 24. This shaft also carries a ratchet wheel 40 which is engaged by a pawl 41 pivoted to the other end of the bell crank lever.

It will be obvious that during a portion of each rotation of crank arm 37 carried by shaft 36, the pawl will slide over the teeth of the ratchet, and consequently there will be no movement imparted to shafts 24 and the carrying chains. As soon as the pawl engages a tooth of the ratchet wheel, however, forward movement will be imparted to the shaft 24 which carries ratchet wheel 40, and the carrying chains will be moved forward, the cross-rods thereon acting to move dies engaged thereby over the surface of the bed and the stationary platens. This feeding movement is so regulated that each forward movement of the carrying chains will carry the dies that are being used from one pair of platens to the next. As soon as the dies reach the next pair of platens, the forward movement of the carrying chains will cease and the movable platens will move downward and exert pressure upon the material in the dies. As soon as the pressure of the movable platens upon the dies is relieved and the movable platens commence to rise, the carrying chains will move forward again and move each die to the next pair of platens forward. Any number of dies may of course be used. All the operator has to do is to remove the dies from the bed after they have passed the last pair of platens and place new dies before the cross-rods between the carrying chains ready to be operated upon by the first pair of platens. The operation of the machine is of course the same whether the platens are heated or cooled. In the present instance it may be assumed that the first and second pairs of platens, counting from the left as seen in Fig. 2, are heating platens, and the third and fourth pairs of platens are cooling platens.

In order that the movement of the dies during each forward movement of the carrying chains may be from center to center of the platens, I provide an adjustment of connecting rod 38 upon crank arm 37. The connecting rod is pivoted upon a screw stud 42 (see Fig. 5) which engages a nut 43 adapted to slide in an undercut way 44 in the crank arm. When the screw stud is turned down hard, the overhanging flanges of the way are gripped between the stud and the nut, and the connecting rod is thus locked at any required adjustment.

Having thus described my invention I claim:—

1. A machine for making plastic articles comprising a plurality of pairs of platens, one platen of each pair being movable, the other stationary, means for heating a pair of platens, means for cooling another pair of platens, dies in which the plastic material is placed, and means for carrying the dies from one pair of platens to another.

2. A machine for making plastic articles comprising a plurality of pairs of platens, one platen of each pair being movable, the other stationary, means for heating successive pairs of platens, means for cooling succeeding pairs of platens, dies in which the plastic material is placed, and means for carrying the dies from one pair of platens to another.

3. A machine for making plastic articles comprising a plurality of pairs of platens, one platen of each pair being movable, the other stationary, means for heating a pair of platens, means for cooling another pair of platens, and means for carrying the material being operated upon from one pair of platens to another.

4. A machine for making plastic articles comprising a bed having sockets, stationary platens therein, movable platens coöperating with the stationary platens, means for heating coöperating platens, means for cooling other coöperating platens, and means for carrying the material being operated upon from one pair of platens to another.

5. A machine for making plastic articles comprising a bed having sockets, stationary platens therein, movable platens coöperating with the stationary platens, means for heating coöperating platens, means for cooling other coöperating platens, dies in which the plastic material is placed, and intermittently moving chains having cross-rods between them, whereby when the movable platens rise the dies are moved over the surface of the bed and the stationary platens from one pair of platens to another.

6. A machine for making plastic articles comprising a bed having sockets, stationary platens therein, movable platens coöperating with the stationary platens, pipes leading to the platens, for the purpose set forth, and means for carrying the material being operated upon from one pair of platens to another.

7. A machine for making plastic articles comprising a bed having sockets, stationary platens therein, movable platens coöperating with the stationary platens, pipes leading to the platens, for the purpose set forth, dies in which the plastic material is placed and intermittently moving chains having cross-rods between them, whereby the dies are moved from one pair of platens to another.

8. A machine for making plastic articles comprising a bed having sockets, stationary platens therein, standards extending from the bed, movable platens reciprocating thereon, crank shafts in the standards, to one of which power is applied, driving connections between the crank shafts, yielding connecting rods between the cranks and the movable platens, and means for carrying the material being operated upon from one pair of platens to another.

9. A machine for making plastic articles comprising a bed having sockets, stationary platens therein, standards extending from the bed, movable platens reciprocating thereon, crank shafts in the standards, to one of which power is applied, driving connections between the crank shafts, yielding connecting rods between the cranks and the movable platens, chains having cross-rods between them, for the purpose set forth, and driving connections from one of the crank shafts, whereby intermittent forward movement is imparted to the chains.

In testimony whereof I affix my signature.

WILLIAM J. BURNS.